US012585410B2

(12) United States Patent   (10) Patent No.: US 12,585,410 B2
Cho et al.   (45) Date of Patent: Mar. 24, 2026

(54) STORAGE DEVICE AND OPERATING METHOD THEREOF

(71) Applicant: SAMSUNG ELECTRONICS CO., LTD., Suwon-si (KR)

(72) Inventors: Hyeongyu Cho, Suwon-si (KR); Inhae Kang, Suwon-si (KR); Sooyun Lee, Suwon-si (KR); Sangwook Yoo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/816,595

(22) Filed: Aug. 27, 2024

(65) Prior Publication Data

US 2025/0094084 A1 Mar. 20, 2025

(30) Foreign Application Priority Data

Sep. 19, 2023 (KR) ........................ 10-2023-0125010
Nov. 24, 2023 (KR) ........................ 10-2023-0165826

(51) Int. Cl.
*G06F 3/06* (2006.01)

(52) U.S. Cl.
CPC .......... *G06F 3/0659* (2013.01); *G06F 3/0604* (2013.01); *G06F 3/0634* (2013.01); *G06F 3/0679* (2013.01)

(58) Field of Classification Search
CPC .... G06F 3/0604; G06F 3/0614; G06F 3/0634; G06F 3/0659; G06F 3/0679
See application file for complete search history.

(56) References Cited

U.S. PATENT DOCUMENTS

| | | | |
|---|---|---|---|
| 7,502,921 | B2 | 3/2009 | Tomlin et al. |
| 8,867,275 | B2 | 10/2014 | Shin et al. |
| 9,496,051 | B2 | 11/2016 | Kim et al. |
| 9,529,541 | B2 | 12/2016 | Cho et al. |
| 9,645,177 | B2 | 5/2017 | Cohen et al. |
| 10,007,458 | B2 | 6/2018 | Bates et al. |
| 10,474,374 | B2 | 11/2019 | Choi et al. |
| 10,878,859 | B2 | 12/2020 | Suhler et al. |
| 2023/0101298 | A1 | 3/2023 | Suzuki et al. |
| 2023/0143943 | A1 | 5/2023 | Kim et al. |

FOREIGN PATENT DOCUMENTS

| | | |
|---|---|---|
| KR | 10-1445025 B1 | 9/2014 |
| KR | 10-2201697 B1 | 1/2021 |
| KR | 10-2411400 B1 | 6/2022 |
| KR | 10-2427267 B1 | 7/2022 |

*Primary Examiner* — Jane W Benner
(74) *Attorney, Agent, or Firm* — Sughrue Mion, PLLC

(57) ABSTRACT

A storage device includes a storage controller and a non-volatile memory including a first memory region including first memory cells having a first data retention time and a second memory region including second memory cells having a second data retention time that is shorter than the first data retention time. Based on an erase request being received from a host in a first operation mode, the storage controller determines whether to switch from the first operation mode to a second operation mode. The storage controller programs program data in a memory region selected from the first memory region and the second memory region in the first operation mode, and the storage controller programs the program data in only the first memory region in the second operation mode.

20 Claims, 10 Drawing Sheets

DATA CAPACITY

STORAGE DEVICE AND OPERATING METHOD THEREOF

CROSS-REFERENCE TO RELATED APPLICATIONS

This application is based on and claims priority under 35 U.S.C. § 119 to Korean Patent Application No. 10-2023-0125010, filed on Sep. 19, 2023, and to Korean Patent Application No. 10-2023-0165826, filed on Nov. 24, 2023 in the Korean Intellectual Property Office, the disclosures of each of which being incorporated by reference herein in their entireties.

BACKGROUND

Devices, apparatuses, and methods consistent with the present disclosure relate to a storage device for programming data in different memory regions according to an operation mode.

As non-volatile memory, flash memory may maintain stored data even when power is turned off. Storage devices including flash memory such as a solid-state drive (SSD) and a memory card are widely used.

Data is stored in the flash memory by changing threshold voltages of memory cells and data is read from the flash memory by using a predetermined read level. However, the threshold voltages of the memory cells may change due to deterioration of the memory cells, and accordingly, a read error may occur. Therefore, it is advantageous to develop a method to prevent a read error from occurring in data stored for a long time.

SUMMARY

It is an aspect to provide a storage device for programming data in different memory regions according to an operation mode.

According to an aspect of one or more embodiments, there is provided a storage device comprising a storage controller; and a non-volatile memory including a first memory region including first memory cells having a first data retention time and a second memory region including second memory cells having a second data retention time that is shorter than the first data retention time. Based on an erase request being received from a host in a first operation mode, the storage controller is configured to determine whether to switch from the first operation mode to a second operation mode. The storage controller is configured to program program data in a memory region selected from the first memory region and the second memory region in the first operation mode, and the storage controller is configured to program the program data in only the first memory region in the second operation mode.

According to another aspect of one or more embodiments, there is provided a storage device comprising a storage controller; and a non-volatile memory including a first memory region including first memory cells having a first data retention time and a second memory region including second memory cells having a second data retention time that is less than the first data retention time. Based on an erase request being received from a host in a first operation mode, the storage controller is further configured to switch from the first operation mode to a second operation mode when a capacity of memory blocks of which data is requested to be erased is greater than a reference capacity and a valid page count (VPC) of the non-volatile memory is less than a first reference count, and to maintain the first operation mode when the capacity is less than or equal to the reference capacity or the VPC is greater than or equal to the first reference count. When a program request is received from the host in the first operation mode, the storage controller is configured to program program data in a memory region selected from the first memory region and the second memory region, and when the program request is received from the host in the second operation mode, the storage controller is configured to program the program data only in the first memory region.

According to yet another aspect of one or more embodiments, there is provided an operating method of a storage device including a non-volatile memory including a first memory region including first memory cells and a second memory region including second memory cells and a storage controller configured to program data or erase data in the non-volatile memory based on a request received from a host, the operating method comprising receiving an erase request from the host in a first operation mode in which the program data is programmed in a memory region selected from the first memory region and the second memory region; determining whether a capacity of memory blocks of which data is requested to be erased is greater than a reference capacity; based on the capacity being less than or equal to the reference capacity, maintaining the first operation mode; based on the capacity being greater than the reference capacity, determining whether a valid page count (VPC) of the non-volatile memory is less than a first reference count; based on the VPC being greater than or equal to the first reference count, maintaining the first operation mode; and based on the VPC being less than the first reference count, switching from the first operation mode to a second operation mode in which the program data is programmed only in the first memory region.

BRIEF DESCRIPTION OF THE DRAWINGS

Various embodiments will be more clearly understood from the following detailed description taken in conjunction with the accompanying drawings, in which.

DETAILED DESCRIPTION

Hereinafter, various embodiments will be described in detail with reference to the accompanying drawings. As used in this specification, the phrase "at least one of A, B, and C" includes within its scope "only A", "only B", "only C", "A and B", "B and C", "A and C", and "all of A, B, and C."

Figure 1:
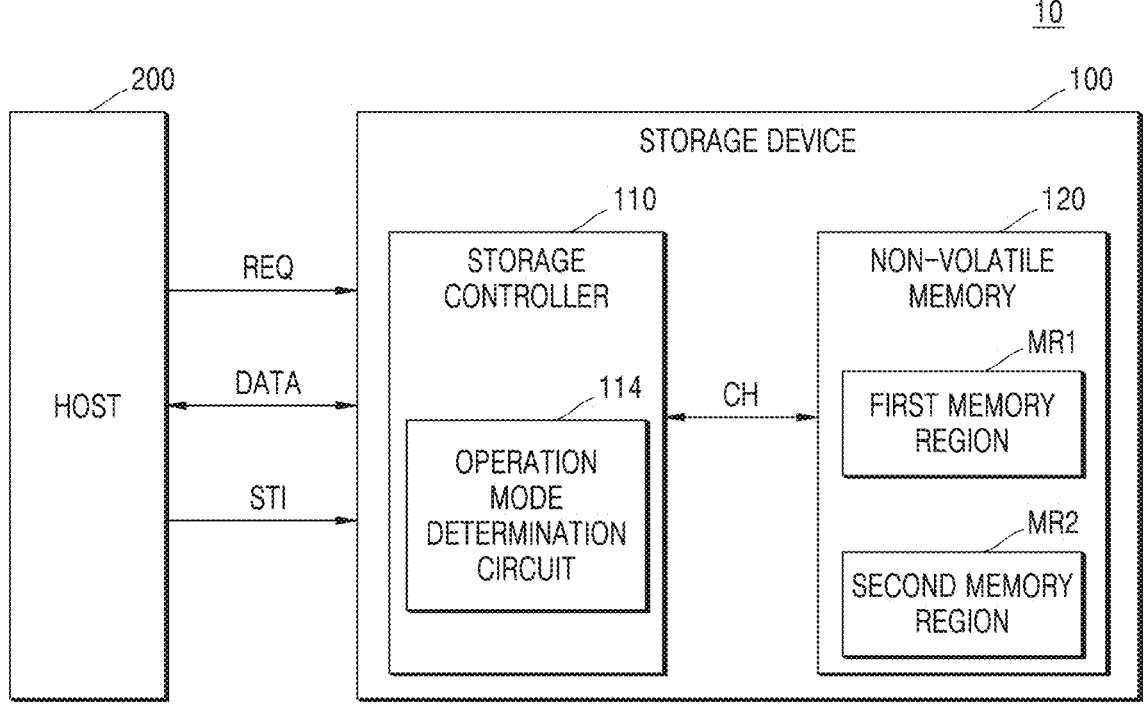
FIG. 1 is a block diagram illustrating a storage system according to an embodiment.

FIG. 1 is a block diagram illustrating a storage system 10 according to an embodiment.

Referring to FIG. 1, the storage system 10 may include a storage device 100 and a host 200.

The storage system 10 may be implemented, for example, as a personal computer (PC), a data server, a network-attached storage (NAS), an Internet of Things (IoT) device, or a portable electronic device. The portable electronic device may include a laptop computer, a mobile phone, a smartphone, a tablet PC, a personal digital assistant (PDA), an enterprise digital assistant (EDA), a digital still camera, a digital video camera, an audio device, a portable multi-media player (PMP), a personal navigation device (PND), an MP3 player, a handheld game console, an e-book, or a wearable device.

The storage device 100 may include storage media for storing data DATA according to a request REQ from the host 200. For example, the storage device 100 may include at least one of a solid-state drive (SSD), embedded memory, and removable external memory. When the storage device 100 includes the SSD, the storage device 100 may comply with a non-volatile memory express (NVMe) standard.

When the storage device 100 includes the embedded memory or the external memory, the storage device 100 may comply with a universal flash storage (UFS) or embedded multi-media card (eMMC) standard. The host 200 and the storage device 100 may each generate and transmit a packet according to an adopted standard protocol. In an embodiment, the storage device 100 may include memory embedded in the storage system 10, for example, an eMMC and/or embedded UFS memory device. In an embodiment, the storage device 100 may include external memory removable from the storage system 10, for example, one or more of an UFS memory card, compact flash (CF), secure digital (SD), micro-SD, mini-SD, extreme digital (xD), and/or a memory stick.

The host 200 may communicate with the storage device 100 through various interfaces, and may transmit storage time information (STI), and a request REQ such as a read request, a program request, or an erase request to the storage device 100. In an embodiment, the host 200 may be implemented as an application processor (AP) or a system-on-chip (SoC).

The storage device 100 may include a storage controller 110 and non-volatile memory 120.

The storage controller 110 may control an operation of the non-volatile memory 120 through a channel CH. The storage controller 110 may control the non-volatile memory 120 to read the data DATA stored in the non-volatile memory 120 in response to the read request received from the host 200. The storage controller 110 may control the non-volatile memory 120 to program the data DATA in the non-volatile memory 120 in response to the program request received from the host 200. The storage controller 110 may control the non-volatile memory 120 to delete the data DATA stored in the non-volatile memory 120 in response to the erase request received from the host 200.

In an embodiment, the storage controller 110 may include an operation mode determination circuit 114. The operation mode determination circuit 114 may determine an operation mode of the storage device 100. The operation mode may include a first operation mode and a second operation mode.

In the first operation mode, the storage controller 110 may control program data, which is requested to be programmed, to be programmed in a memory region selected from a first memory region MR1 and a second memory region MR2 of the non-volatile memory 120. When the program request is received from the host 200 when the operation mode is the first operation mode, the storage controller 110 may program the program data in the memory region selected from the first memory region MR1 and the second memory region MR2 of the non-volatile memory 120.

In the second operation mode, the storage controller 110 may control the program data to be programmed in the first memory region MR1 of the non-volatile memory 120. When the program request is received from the host 200 when the operation mode is the second operation mode, the storage controller 110 may program the program data in the first memory region MR1 of the non-volatile memory 120.

The operation mode determination circuit 114 may determine the operation mode as the first operation mode in normal times. That is, the storage device 100 may program the program data in a memory region selected from the first memory region MR1 and the second memory region MR2 of the non-volatile memory 120 in normal times.

The operation mode determination circuit 114 may switch the operation mode from the first operation mode to the second operation mode when program data is to be stored for a long time, such as data on an operating system (OS) in the storage device 100. In other words, when program data is data to be stored for a long time, such as OS data, the operation mode determination circuit 114 may switch the operation mode to the second operation mode.

In an embodiment, when an erase request is received from the host 200 when the operation mode is the first operation mode, the operation mode determination circuit 114 may determine whether to switch the operation mode to the second operation mode based on whether a capacity of memory blocks of which data is requested to be erased is greater than reference capacity. For example, in some embodiments, when the erase request from the host 200 requests to erase all memory blocks (for example, in an initial formatting operation), the operation mode determination circuit 114 may switch the operation mode to the second operation mode.

In an embodiment, when the erase request is received from the host 200 when the operation mode is the first operation mode, the operation mode determination circuit 114 may determine whether to switch the operation mode to the second operation mode based on whether the capacity of the memory blocks of which data is requested to be erased is greater than the reference capacity and based on whether a valid page count (VPC) of the non-volatile memory 120 is less than a first reference count.

A more specific operation of the storage controller 110 will be described later.

In an embodiment, when the non-volatile memory 120 of the storage device 100 includes flash memory, the flash memory may include a two-dimensional (2D) NAND memory array or a three-dimensional (3D) (or vertical) NAND (VNAND) memory array. In an embodiment, the non-volatile memory 120 may include various other types of non-volatile memory. For example, in an embodiment, the non-volatile memory 120 may include one of magnetic random access memory (MRAM), spin-transfer torque MRAM, conductive bridging RAM (CBRAM), ferroelectric RAM (FeRAM), phase-change RAM (PRAM), resistive RAM (RRAM), and various other types of memory.

The non-volatile memory 120 may include a first memory region MR1 and a second memory region MR2. The first memory region MR1 may include first memory cells. The second memory region MR2 may include second memory cells.

The first memory cells may have different data capacities from the second memory cells. The first memory cells may include memory cells storing data of less than n bits (n is a natural number of 2 or more). The second memory cells may include memory cells storing data of n bits or more. Data capacity stored in one memory cell of the first memory cells may be smaller than that of the second memory cells.

For example, when n is 2, the first memory cells may include single level cells (SLC) storing 1-bit data, and the second memory cells may include multi-level cells (MLC) storing 2-bit data, triple level cells (TLC) storing 3-bit data, and quad level cells (QLC) storing 4-bit data.

For example, when n is 3, the first memory cells may include single level cells and multi-level cells, and the second memory cells may include triple level cells and quad level cells.

For example, when n is 4, the first memory cells may include single level cells, multi-level cells, and triple level cells and the second memory cells may include quad level cells.

The value "n" may be set considering retention times of memory cells included in the non-volatile memory 120. The retention time may be a time during which reliability of data stored in a memory cell is guaranteed. As the data capacity stored in one memory cell increases, the retention time may decrease. Because the data capacity stored in the first memory cells is smaller than the data capacity stored in the second memory cells, the retention time of the first memory cells may be longer than the retention time of the second memory cells.

For example, when the retention time required for the first memory cells is 7 years, the retention time for the single level cells is 7 years, the retention time for the multi-level cells is 3 years, the retention time for the triple level cells is 1 year, and the retention time for the quad level cells is 3 months, n may be set to 2.

The storage controller 110 of the storage device 100 according to an embodiment may determine a memory region for programming program data differently according to the operation mode. When the program request is received from the host 200 when the operation mode is the second operation mode, the storage controller 110 may program the program data in the first memory region MR1 of the non-volatile memory 120. More specifically, in an embodiment, when the program request is received from the host 200 when the operation mode is the second operation mode, the storage controller 110 may program the program data in the first memory cells of the first memory region MR1 of the non-volatile memory 120. By programming the program data in the first memory region including the first memory cells having relatively long retention times in the second operation mode as described above, it is possible to prevent a read error from occurring in the data stored in the storage device 100 for a long time. In other words, it is possible to prevent a read error from occurring with respect to data that is stored in the storage device 100 for a long time and then read after the long time has elapsed.

Figure 2:
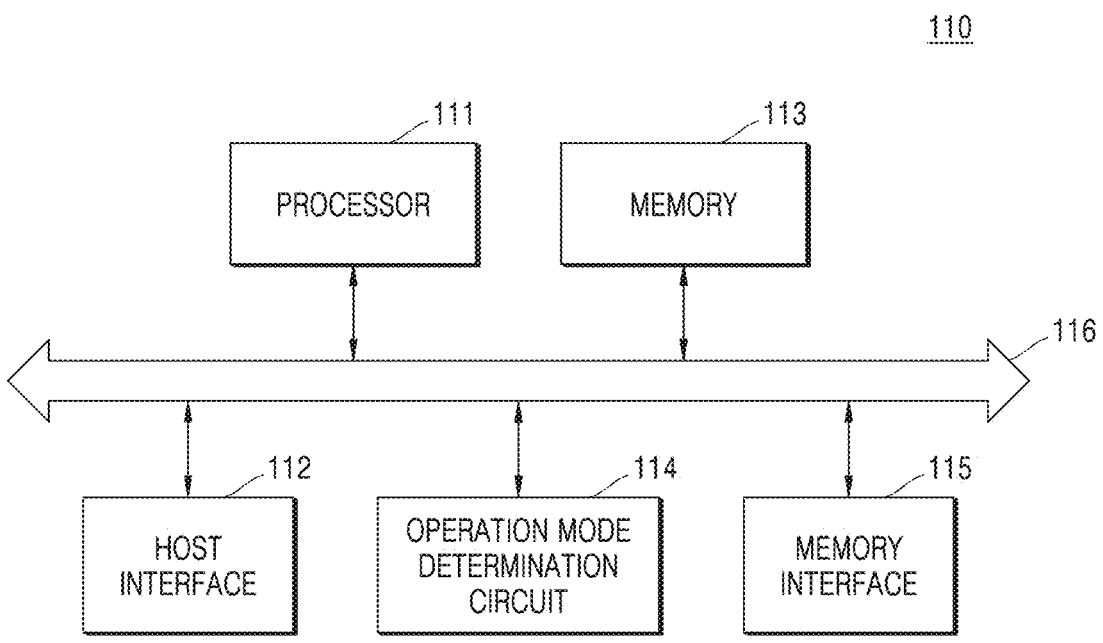
FIG. 2 is a block diagram illustrating a detailed structure of a storage controller included in a storage device of the storage system, according to an embodiment.

FIG. 2 is a block diagram illustrating a detailed structure of the storage controller 110 included in the storage device 100, according to an embodiment.

Referring to FIG. 2, the storage controller 110 may include a processor 111, a host interface 112, memory 113, the operation mode determination circuit 114, and a memory interface 115, which may communicate with one another through a bus 116.

The processor 111 may include a central processing unit (CPU) or a microprocessor and may control an overall operation of the storage controller 110. The processor 111 may include one or more processor cores capable of executing an instruction set of a program code configured to perform a specific operation. For example, the processor 111 may execute an instruction code of firmware stored in the memory 113.

The host interface 112 may provide an interface between the host 200 and the controller 110. For example, in an embodiment, the host interface 112 may be an interface according to a universal serial bus (USB), MMC, PCI Express (PCI-E), AT attachment (ATA), serial AT attachment (SATA), parallel AT attachment (PATA), a small computer system interface (SCSI), a serial attached SCSI (SAS), an enhanced small disk interface (ESDI), or integrated drive electronics (IDE). The host interface 112 may receive the request REQ, the data DATA, and the storage time information STI from the host 200, and may output the data DATA.

The memory 113 may be used as operating memory, buffer memory, or cache memory. For example, in an embodiment, the memory 113 may be implemented as dynamic random access memory (DRAM), static random access memory (SRAM), PRAM, or flash memory.

In an embodiment, when the capacity of the memory blocks, of which data is requested to be erased and which corresponds to the erase request received from the host 200, is greater than a reference capacity when the operation mode is the first operation mode, the operation mode determination circuit 114 may switch the operation mode to the second operation mode.

In an embodiment, when the capacity of the memory blocks, of which data is requested to be erased and which corresponds to the erase request received from the host 200, is greater than the reference capacity and the VPC of the non-volatile memory 120 is less than a first reference count when the operation mode is the first operation mode, the operation mode determination circuit 114 may switch the operation mode to the second operation mode.

The operation mode determination circuit 114 may be implemented as hardware, software, or firmware. When the operation mode determination circuit 114 is implemented as software or firmware, the operation mode determination circuit 114 may be loaded into the memory 113 and may operate under the control of the processor 111.

The memory interface 115 may provide an interface between the controller 110 and the non-volatile memory 120. For example, data, commands, and addresses may be transmitted and received between the controller 110 and the non-volatile memory 120 through the memory interface 115.

In some embodiments, the storage controller 110 may further include a flash translation layer (FTL), a packet manager, an error correction code (ECC) engine, and an advanced encryption standard (AES) engine. The FTL may perform various functions such as address mapping, wear-leveling, and garbage collection. The packet manager may generate a packet according to a protocol of an interface negotiated with the host 200, or may parse various information from the packet received from the host 200. The ECC engine may perform an error detection and correction function on read data by using parity bits of the read data read from the non-volatile memory 120. The AES engine may perform at least one of an encryption operation and a decryption operation on data input to the storage controller 110 by using a symmetric-key algorithm.

Figure 3:
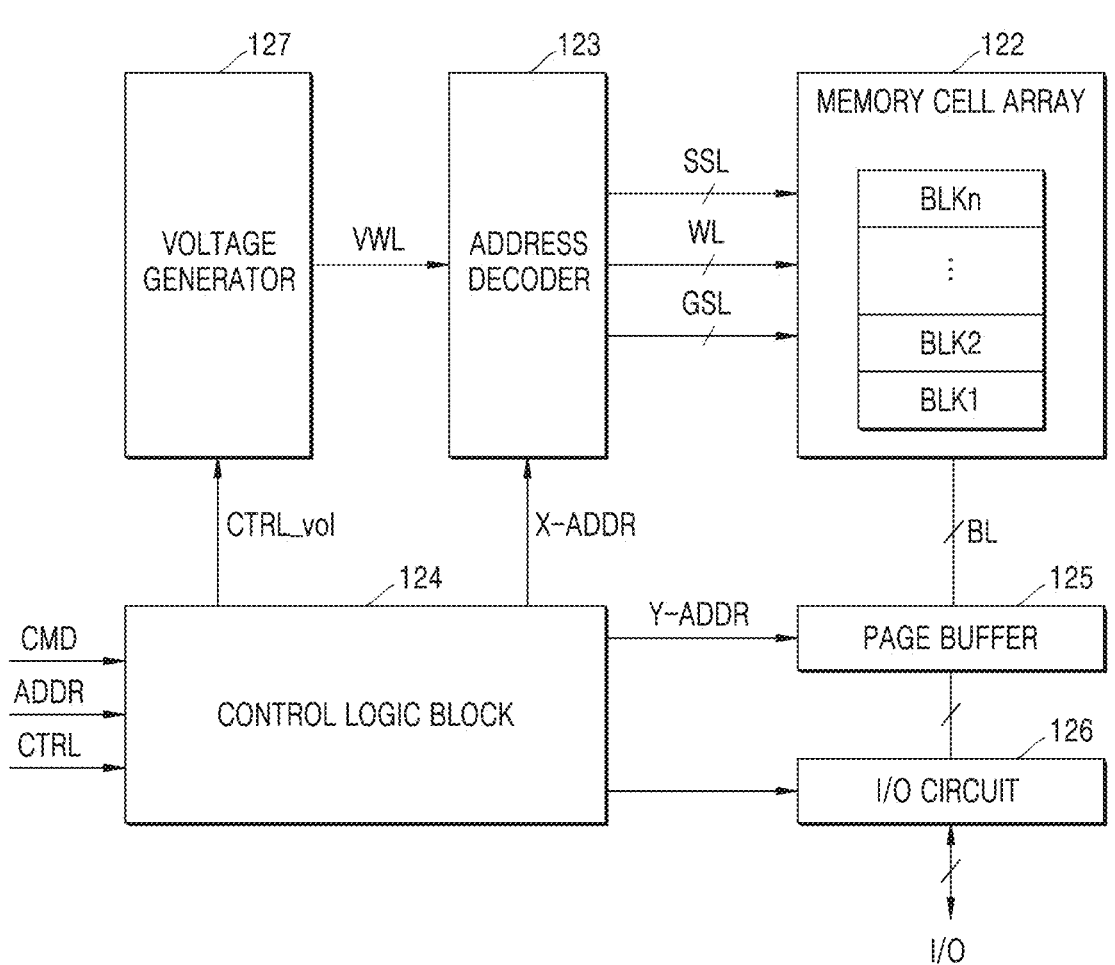
FIG. 3 is a block diagram illustrating a detailed structure of non-volatile memory included in a storage device of the storage system, according to an embodiment.

FIG. 3 is a block diagram illustrating a detailed structure of non-volatile memory 120A included in the storage device 100, according to an embodiment.

Referring to FIG. 3, the non-volatile memory 120A may include a memory cell array 122, an address decoder 123, a control logic block 124, a page buffer 125, an input/output (I/O) circuit 126, and a voltage generator 127. Although not shown in FIG. 3, in some embodiments, the non-volatile memory 120A may further include an input/output interface.

The memory cell array 122 may be connected to word lines WL, string selection lines SSL, ground selection lines GSL, and bit lines BL. The memory cell array 122 may be connected to the address decoder 123 through the word lines WL, the string selection lines SSL, and the ground selection lines GSL, and may be connected to the page buffer 125 through the bit lines BL. The memory cell array 122 may include a plurality of memory blocks BLK1 to BLKn.

Each of the plurality of memory blocks BLK1 to BLKn may include a plurality of memory cells and a plurality of selection transistors. The plurality of memory cells may be connected to the word lines WL, and the plurality of selection transistors may be connected to the string selection lines SSL or the ground selection lines GSL. Each of the plurality of memory blocks BLK1 to BLKn may correspond to an erase unit. In other words, in an embodiment, an erase unit may be by block. Each of the plurality of memory blocks BLK1 to BLKn may include a plurality of pages, and each of the plurality of pages may correspond to a program unit or read unit of data in one memory block. In other words, in an embodiment, the program unit or the read unit may be by page.

The plurality of memory blocks BLK1 to BLKn may be divided into the first memory region MR1 and the second memory region MR2 of FIG. 1. For example, the first memory region MR1 may include a plurality of memory blocks including single level cells, and the second memory region MR2 may include a plurality of memory blocks including multi-level cells, triple level cells, and quad level cells. For example, in some embodiments, the first memory region MR1 may correspond to a first block BLK1 of the plurality of memory blocks BLK1 to BLKn and the second memory region MR2 may correspond to remaining memory blocks of the plurality of memory blocks BLK1 to BLKn. In some embodiments, the first memory region MR1 may correspond to a first memory block BLK1 and a second memory block BLK2 and the second memory region MR2 may correspond to a third memory block BLK3 to an n-th memory block BLKn.

The address decoder 123 may select one of the plurality of memory blocks BLK1 to BLKn of the memory cell array 122, may select one of the word lines WL of the selected memory block, and may select one of the string selection lines SSL.

The control logic block 124 may output various control signals for performing program, read, and erase operations on the memory cell array 122 based on a command CMD, an address ADDR, and a control signal CTRL. The control logic block 124 may provide a row address X-ADDR to the address decoder 123, may provide a column address Y-ADDR to the page buffer 125, and may provide a voltage control signal CTRL_Vol to the voltage generator 127.

The page buffer 125 may operate as a write driver or a sense amplifier according to an operation mode. During a read operation, the page buffer 125 may sense the bit line BL of the selected memory cell under the control of the control logic block 124. The sensed data may be stored in latches provided in the page buffer 125. The page buffer 125 may dump data stored in the latches into the input/output circuit 126 under the control of the control logic block 124.

The input/output (I/O) circuit 126 may temporarily store the command CMD, the address ADDR, the control signal CTRL, and data provided through an input/output line I/O from the outside of the non-volatile memory 120A. The input/output circuit 126 may temporarily store the read data of the non-volatile memory 120A and may output the read data to the outside through the input/output line I/O at a designated point in time.

The voltage generator 127 may generate various types of voltages for performing the program, read, and erase operations on the memory cell array 122 based on the voltage control signal CTRL_Vol. Specifically, the voltage generator 127 may generate a word line voltage VWL, for example, a program voltage, a read voltage, a pass voltage, an erase verification voltage, or a program verification voltage. In an embodiment, the voltage generator 127 may generate a string selection line voltage and a ground selection line voltage based on the voltage control signal CTRL_Vol. In an embodiment, the voltage generator 127 may generate an erase voltage to be provided to the memory cell array 122.

Figure 4:
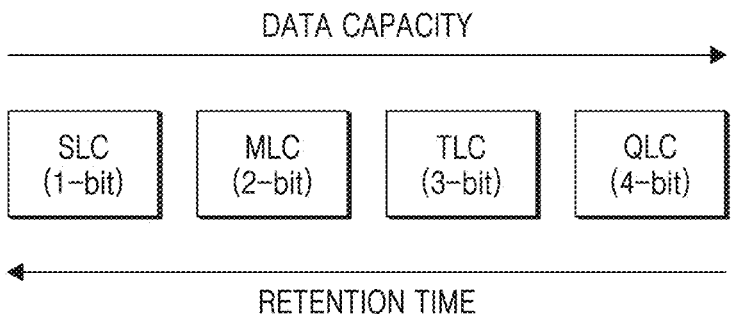
FIG. 4 is a diagram illustrating a correlation between a data capacity of a memory cell included in a storage device and a retention time, according to an embodiment.

FIG. 4 is a diagram illustrating a correlation between a data capacity of a memory cell included in a storage device and a retention time, according to an embodiment.

Referring to FIG. 4, a correlation between data capacities and retention times of various kinds of memory cells may be confirmed. When data capacity stored in a memory cell increases, a retention time of the memory cell may decrease.

Data capacity stored in a memory cell increases from a single level cell SLC in which 1-bit data is stored to a quad level cell QLC in which 4-bit data is stored. However, a retention time of the memory cell may decrease from the single level cell SLC in which 1-bit data is stored to the quad level cell QLC in which 4-bit data is stored. By contrast, data capacity stored in a memory cell decreases from the quad level cell QLC in which 4-bit data is stored to the single level cell SLC in which 1-bit data is stored. However, a retention time of the memory cell may increase from the quad level cell QLC in which 4-bit data is stored to the single level cell SLC in which 1-bit data is stored.

That is, data stored in the quad level cell QLC may deteriorate faster than data stored in the triple level cell TLC, data stored in the triple level cell TLC may deteriorate faster than data stored in the multi-level cell MLC, and data stored in the multi-level cell MLC may deteriorate faster than data stored in the single level cell SLC.

Figure 5:
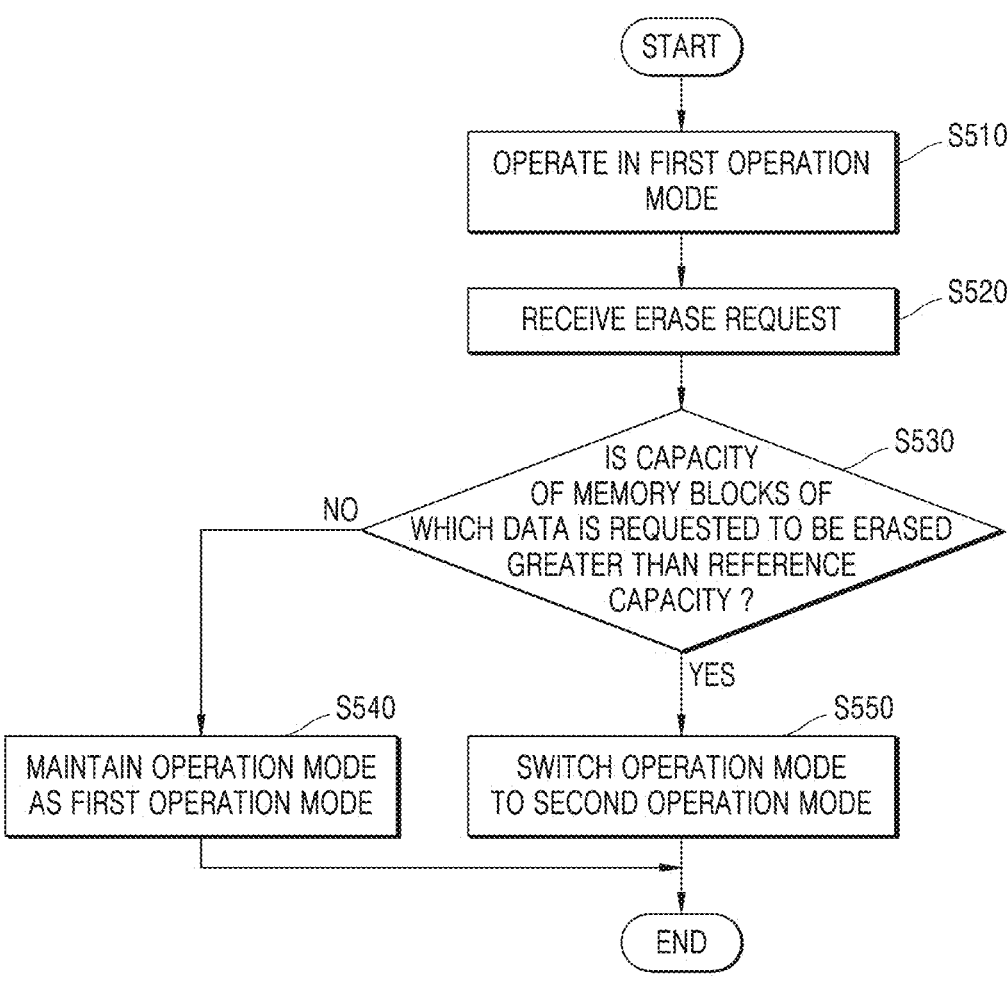
FIG. 5 is a flowchart illustrating an example of an operation method when an operation mode of a storage device is a first operation mode, according to an embodiment.

FIG. 5 is a flowchart illustrating an example of an operation method when an operation mode of a storage device 100 is a first operation mode, according to an embodiment.

FIG. 5 is a flowchart illustrating an example of an operation of determining the operation mode of the storage device 100 when the operation mode of the storage device 100 is the first operation mode, according to an embodiment.

In operation S510, the storage device 100 may operate in the first operation mode. When the program request is received from the host 200 when the operation mode includes the first operation mode, the storage controller 110 may program the program data in a memory region selected from the first memory region MR1 and the second memory region MR2.

As described above, when the storage device 100 is operating in the first operation mode, in operation S520, the storage controller 110 may receive the erase request. At this time, since the erase request is received, the storage controller 110 may perform an erase operation on memory blocks of which data is requested to be erased among the plurality of memory blocks in the non-volatile memory 120.

When the erase request is received from the host 200, in operation S530, the storage controller 110 may determine whether a capacity of the memory blocks of which data is requested to be erased is greater than a reference capacity.

The capacity of the memory blocks of which data is requested to be erased may refer to capacity of the memory blocks of the non-volatile memory 120 on which the erase operation is performed according to the erase request received in operation S520.

The reference capacity may include a capacity serving as a reference for determining whether the capacity of the memory blocks of which data is requested to be erased is an erase request for most or all regions of the non-volatile memory 120. In an embodiment, the reference capacity may be set to be a first reference ratio of the total capacity of the non-volatile memory 120 or more. For example, in an embodiment, the first reference ratio may be set to a ratio close to 100%, such as 99%.

The storage controller 110 may determine whether the capacity of the memory blocks of which data is requested to be erased is greater than the reference capacity to determine whether an operation such as a format for deleting most or all of the data stored in the non-volatile memory 120 is requested by the host 200.

When it is determined that the capacity of the memory blocks of which data is requested to be erased is the reference capacity or less (operation S530, NO), the process proceeds to operation S540 and the storage controller 110 may maintain the operation mode as the first operation mode.

When it is determined that the capacity of the memory blocks of which data is requested to be erased is the reference capacity or less, the storage controller 110 may determine that an operation that is not an operation such as the format but rather a simple erase operation is requested by the host 200. Accordingly, the storage controller 110 may maintain the first operation mode without switching the operation mode to the second operation mode.

When it is determined that the capacity of the memory blocks of which data is requested to be erased is greater than the reference capacity (operation S530, YES), the process proceeds to operation S550 and the storage controller 110 may switch the operation mode to the second operation mode.

When it is determined that the capacity of the memory blocks of which data is requested to be erased is greater than the reference capacity (operation S530, YES), the storage controller 110 may determine that the operation such as a format operation is requested by the host 200. After the format for the storage device 100 is performed by the request of the host 200, the host 200 may program data to be stored in the storage device 100 for a long time, such as data on the OS. Accordingly, the storage controller 110 may switch the operation mode to the second operation mode.

When the program request is received from the host 200 when the operation mode is the second operation mode, the storage controller 110 may program the program data in the first memory region MR1. The first memory region MR1 may include memory cells having a longer retention time than the second memory region MR2.

When data to be stored for a long time is to be programmed as described above, the storage controller 110 switches the operation mode of the storage device 100 to the second operation mode and programs the program data in the first memory region MR1 including first memory cells having a relatively long retention time to prevent a read error from occurring after the data that stored in the storage device 100 for a long time is read after the long time.

In an embodiment, although the storage controller 110 does not receive a format request or OS installation-related information from the host 200, the storage controller 110 may determine the format request or the OS installation-related information and may program the data on the OS in the first memory region MR1 having a relatively long retention time to program data that is to be stored for a long time in the first memory region MR1 without a specific request the host 200. In other words, in an embodiment, the storage controller 110 does not receive a specific format request or a specific format command and does not receive a specific request to install OS related information or a specific OS installation command from the host 200, but rather determines to switch the operation mode depending on the nature of an erase request.

Figure 6:
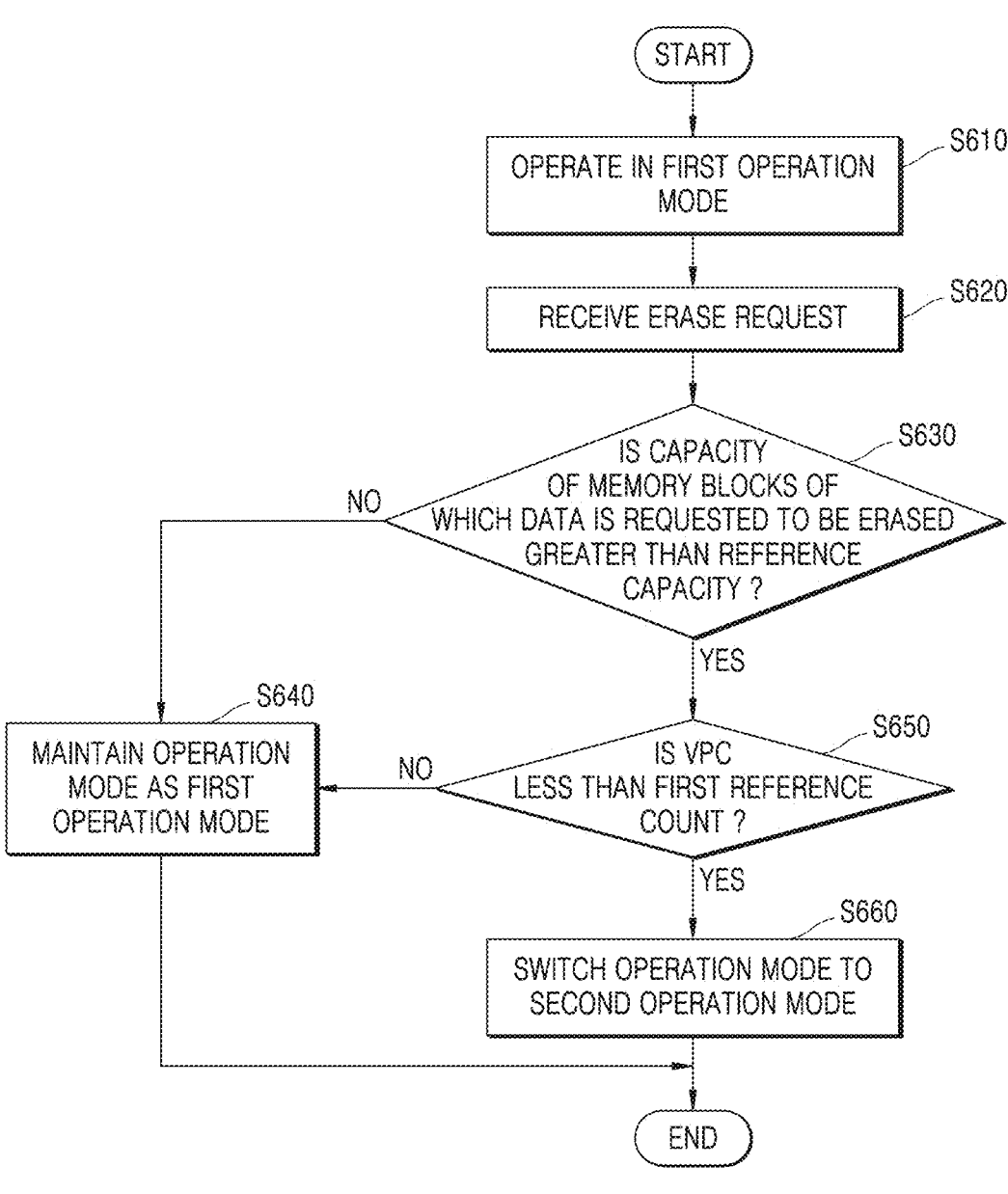
FIG. 6 is a flowchart illustrating another example of an operation method when the operation mode of the storage device is the first operation mode, according to an embodiment.

FIG. 6 is a flowchart illustrating another example of an operation method when the operation mode of the storage device 100 is the first operation mode, according to an embodiment.

FIG. 6 is a flowchart illustrating another example of the operation of determining the operation mode of the storage device 100 when the operation mode of the storage device 100 is the first operation mode, according to an embodiment.

In operation S610, the storage device 100 may operate in the first operation mode. The operation of operation S610 may be the same as the operation of operation S510 of FIG. 5.

In operation S620, the storage controller 110 may receive the erase request. The operation of operation S620 may be the same as the operation of operation S520 of FIG. 5.

In operation S630, the storage controller 110 may determine whether the capacity of the memory blocks of which data is requested to be erased is greater than the reference capacity. The operation of operation S630 may be the same as the operation of operation S530 of FIG. 5.

When it is determined that the capacity of the memory blocks of which data is requested to be erased is the reference capacity or less (operation S630, NO), the process proceeds to operation S640 and the storage controller 110 may maintain the operation mode as the first operation mode. The operation of operation S640 may be the same as the operation of operation S540 of FIG. 5.

When it is determined that the capacity of the memory blocks of which data is requested to be erased is greater than the reference capacity (operation 6530, YES), the process proceeds to operation S650 and the storage controller 110 may determine whether the VPC is less than the first reference count. That is, unlike the embodiment of FIG. 5, in the embodiment of FIG. 6, when the capacity of the memory blocks of which data is requested to be erased is greater than the reference capacity, the storage controller 110 may additionally determine whether the VPC of the non-volatile memory 120 is less than the first reference count, and may determine whether to switch the operation mode to the second operation mode based on the determination result.

The VPC may represent the number of valid physical pages among a plurality of physical pages in the non-volatile memory 120.

The first reference count may include a reference value for determining whether there are few valid physical pages in the non-volatile memory 120. In an embodiment, the first reference count may be set to be less than a second reference ratio of the total number of pages included in the non-volatile memory 120. For example, in an embodiment, the second reference ratio may be set to a ratio close to 0%, such as 0.1%.

The storage controller 110 may determine whether the VPC is less than the first reference count to determine whether there is little data stored in the non-volatile memory 120. That is, the storage controller 110 may determine whether the VPC is less than the first reference count to determine once again whether most of the data stored in the non-volatile memory 120 is deleted according to the erase request.

When it is determined that the VPC is the first reference count or more (operation S650, NO), the process proceeds to operation S640 and the storage controller 110 may maintain the operation mode as the first operation mode.

When it is determined that the VPC is less than the first reference count (operation S650, YES), the process proceeds to operation S660 and the storage controller 110 may switch the operation mode to the second operation mode.

When it is determined that the capacity of the memory blocks of which data is requested to be erased is greater than the reference capacity and the VPC is less than the first reference count, the storage controller 110 may determine that an operation such as the format operation is requested by the host 200 so that most of the data is deleted from the non-volatile memory 120. After the format for the storage device 100 is performed by the request of the host 200, the host 200 may program data to be stored in the storage device 100 for a long time, such as the data on the OS. When the data to be stored for a long time is to be programmed as described above, the storage controller 110 may switch the operation mode to the second operation mode in order to use the first memory region MR1 for such storage.

Figure 7:
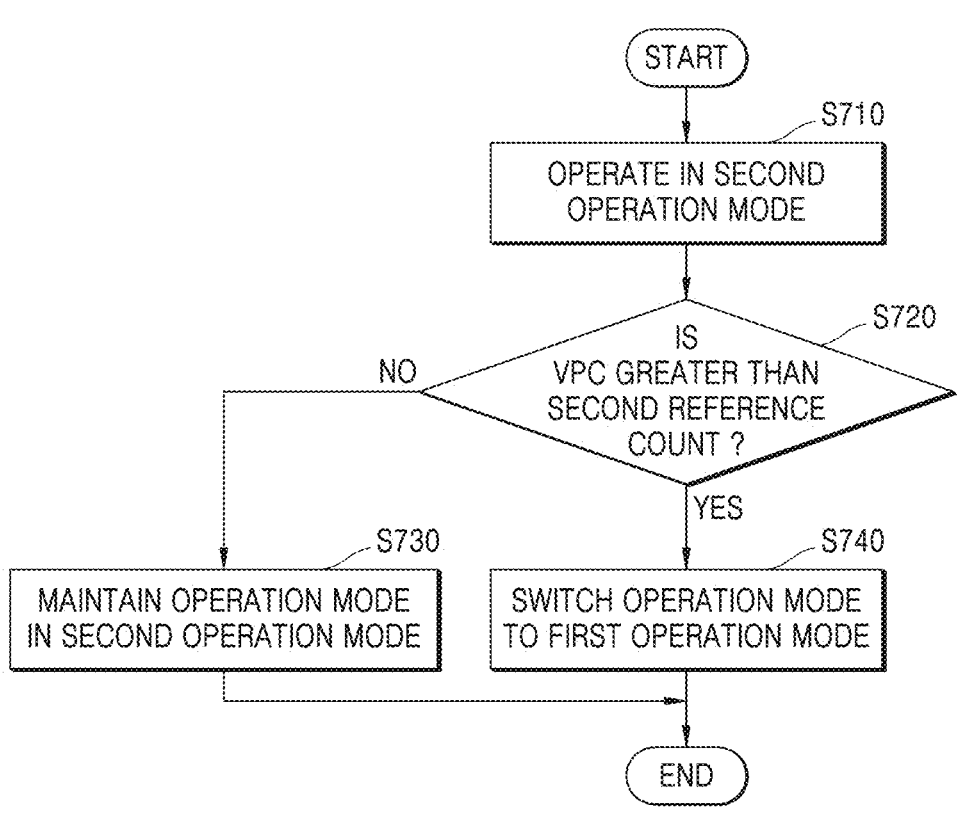
FIG. 7 is a flowchart illustrating an operation method when an operation mode of a storage device is a second operation mode, according to an embodiment.

FIG. 7 is a flowchart illustrating an operation method when an operation mode of a storage device 100 is a second operation mode, according to an embodiment.

FIG. 7 is a flowchart illustrating another example of an operation of determining the operation mode of the storage device 100 when the operation mode of the storage device 100 is the second operation mode, according to an embodiment.

In operation S710, the storage device 100 may operate in the second operation mode. When the program request is received from the host 200 when the operation mode is the second operation mode, the storage controller 110 may program the program data in the first memory region MR1.

In an embodiment, when the operation mode is the second operation mode, the storage controller 110 may perform a compaction operation on the program data and may program the compacted program data in the first memory region MR1 when the program request is received from the host 200. The compaction operation may be for compressing the program data to store valid data in a minimum number of memory blocks. That is, the storage controller 110 performs the compaction operation on the program data to compress the program data and programs the compressed program data in the first memory region MR1 to minimize the number of memory blocks in which valid data is stored and to secure a plurality of free memory blocks.

As described above, when the storage device 100 is operating in the second operation mode, in operation S720, the storage controller 110 may determine whether the VPC is greater than a second reference count.

The second reference count may include a value for determining whether most of the pages included in the first memory region MR1 of the non-volatile memory 120 are valid. In an embodiment, the second reference count may be set to be a third reference ratio of the total number of pages included in the first memory region MR1 or more. For example, in an embodiment, the third reference ratio may be set to a ratio close to 100% such as 99%, and the second reference count may have a value slightly smaller than the total number of pages included in the first memory region MR1.

The storage controller 110 may determine whether the VPC is greater than the second reference count to determine whether most of the pages with data are stored in the first memory region MR1 of the non-volatile memory 120. The storage controller 110 may determine whether the VPC is greater than the second reference count to determine whether most of the data to be stored for a long time in the second operation mode is stored.

When it is determined that the VPC is the second reference count or less (operation S720, NO), the process proceeds to operation S730 and the storage controller 110 may maintain the operation mode as the second operation mode.

When it is determined that the VPC is greater than the second reference count (operation S720, YES), the process proceeds to operation S740 and the storage controller 110 may switch the operation mode to the first operation mode.

As described above, the storage controller 110 may determine whether to switch the operation mode to the first operation mode based on whether the VPC of the non-volatile memory 120 is greater than the second reference count.

Figure 8:
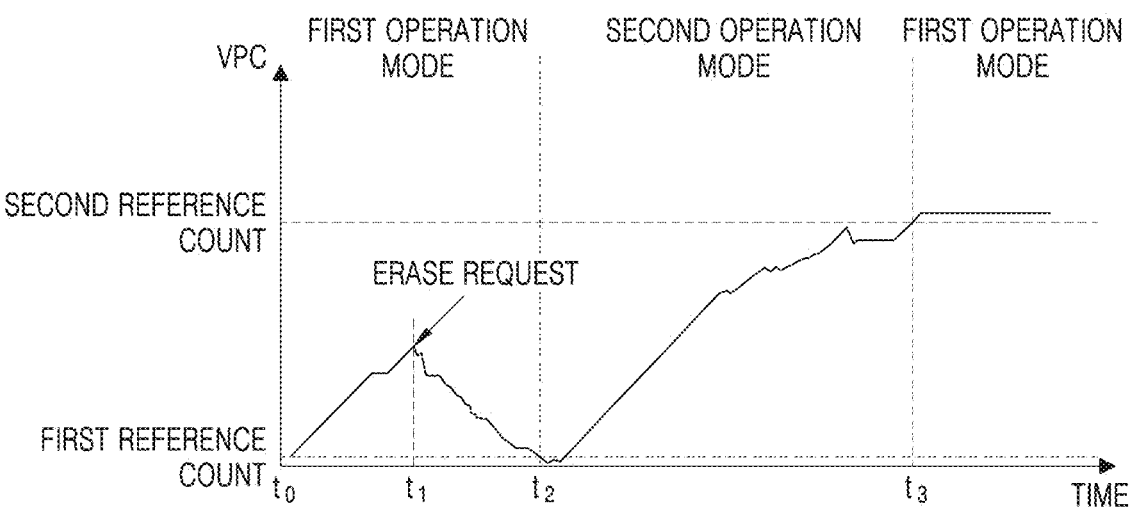
FIG. 8 is a graph illustrating an example of a change in an operation mode of a storage device, according to an embodiment.

FIG. 8 is a graph illustrating an example of a change in operation mode of a storage device 100, according to an embodiment.

Referring to FIG. 8, at an initial point in time to, the storage device 100 may operate in the first operation mode. At this time, the storage device 100 may program the program data in a region selected from the first memory region MR1 and the second memory region MR2 of the non-volatile memory 120 based on the program request received from the host 200, and accordingly, the VPC may increase.

While the storage device 100 is operating in the first operation mode, at a first point in time $t_1$, the storage device 100 may receive the erase request from the host 200 in which the capacity of the memory blocks of which data is requested to be erased is greater than the reference capacity. The storage device 100 may perform an erase operation on the plurality of memory blocks in the non-volatile memory 120 based on the erase request that is received.

After the storage device 100 performs the erase operation, the VPC may be less than the first reference count at a second point in time $t_2$. At this time (i.e., at time $t_2$), the storage device 100 may switch the operation mode to the second operation mode since the capacity of the memory blocks, of which data is requested to be erased and which corresponds to the erase request, is greater than the reference capacity and the VPC is less than the first reference count.

From the second point in time $t_2$, the storage device 100 may program the program data in the first memory region MR1 of the non-volatile memory 120 based on the program request received from the host 200, and accordingly, the VPC may increase. At this time, the storage device 100 may program data to be stored for a long time in the first memory region MR1 of the non-volatile memory 120, such as the data on the OS.

While the storage device 100 is operating in the second operation mode, at a third point in time $t_3$, the VPC may be greater than the second reference count. At this time, since the VPC is greater than the second reference count, the storage device 100 may switch the operation mode to the first operation mode.

Figure 9:
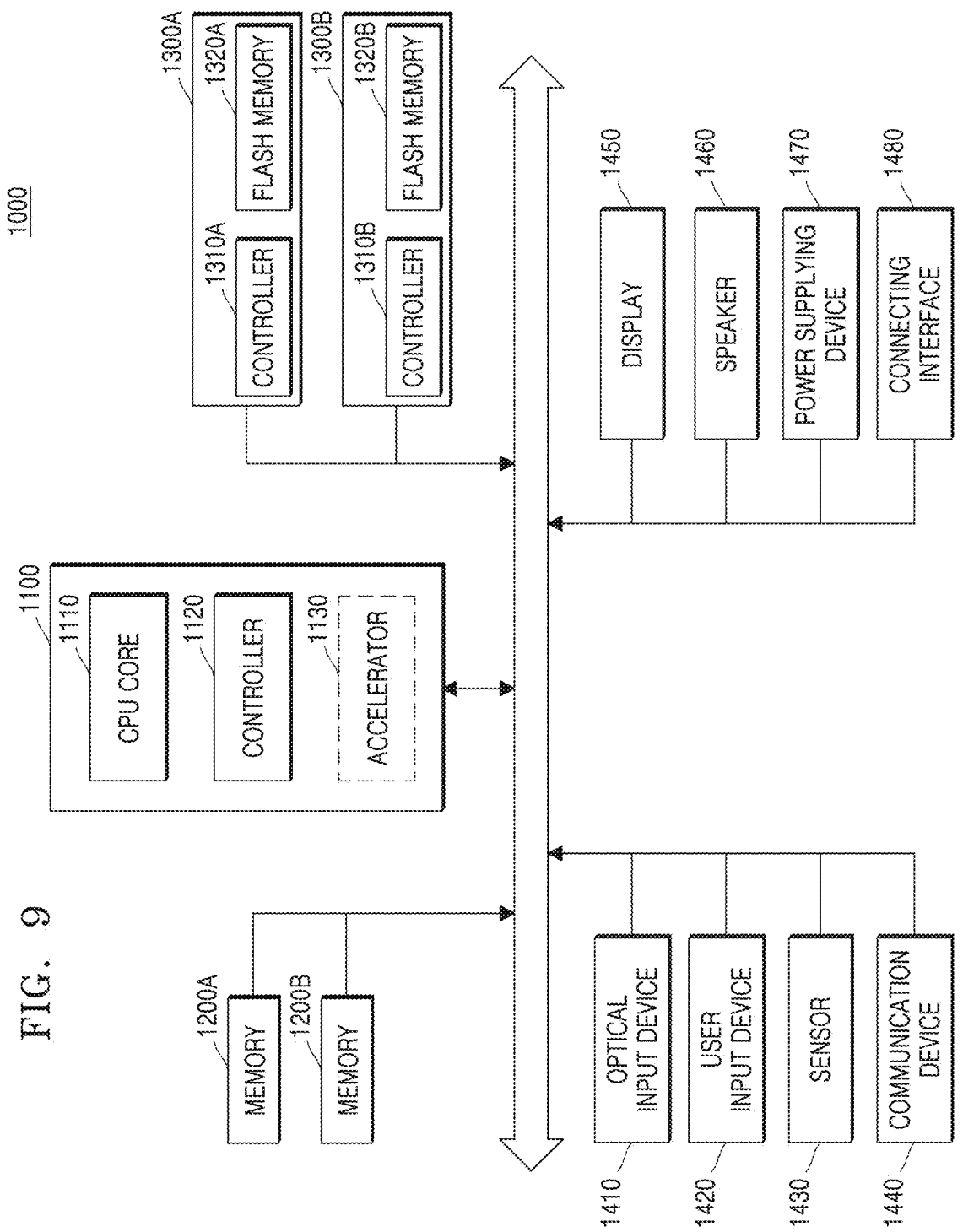
FIG. 9 is a block diagram illustrating a system including a storage device, according to an embodiment.

FIG. 9 is a block diagram illustrating a system 1000 to which a storage device is applied according to an embodiment.

Referring to FIG. 9, the system 1000 may include a mobile system such as a mobile phone, a smartphone, a tablet personal computer (PC), a wearable device, a health-care device, or an Internet of things (IoT) device. However, the system 1000 of FIG. 9 is not limited to the mobile system, and in some embodiments, the system 1000 may include an automotive device such as a PC, a laptop computer, a server, a media player, or a navigation.

Referring to FIG. 9, the system 1000 may include a main processor 1100, memories 1200A and 1200B, and storage devices 1300A and 1300B, and may further include one or more of an image capturing device 1410, a user input device 1420, a sensor 1430, a communication device 1440, a display 1450, a speaker 1460, a power supplying device 1470, and a connecting interface 1480.

The main processor 1100 may control an overall operation of the system 1000, and more specifically, operations of other components constituting the system 1000. The main processor 1100 may be implemented as a general-purpose processor, a microprocessor, a microcontroller, a dedicated processor, or an application processor.

The main processor 1100 may include one or more CPU cores 1110, and may further include a controller 1120 for controlling the memories 1200A and 1200B and/or the storage devices 1300A and 1300B. According to an embodiment, the main processor 1100 may further include an accelerator block 1130, which is a dedicated circuit for a high-speed data operation such as an artificial intelligence (AI) data operation. The accelerator block 1130 may include a graphics processing unit (GPU), a natural processing unit (NPU), and/or a data processing unit (DPU), and may be implemented as a separate chip physically independent of other components of the main processor 1100.

In some embodiments, the memories 1200A and 1200B may be used as main memory devices of the system 1000, and may include volatile memories such as SRAM and/or DRAM. In some embodiments, the memories 1200A and 1200B may include non-volatile memories such as flash memory, PRAM and/or RRAM. In some embodiments, the memories 1200A and 1200B may be implemented in the same package as the main processor 1100.

The storage devices 1300A and 1300B may function as non-volatile storage devices storing data regardless of whether power is supplied, and may have relatively large storage capacity compared to the memories 1200A and 1200B. The storage devices 1300A and 1300B may include storage controllers 1310A and 1310B, and non-volatile memories (NVM) 1320A and 1320B storing data under the control of the storage controllers 1310A and 1310B. In some embodiments, the non-volatile memories 1320A and 1320B may include NAND flash memory. In some embodiments, the non-volatile memories 1320A and 1320B may include other types of non-volatile memories such as PRAM and/or RRAM.

The storage devices 1300A and 1300B may be included in the system 1000 in a state of being physically separate from the main processor 1100, or may be implemented in the same package as the main processor 1100. In some embodiments, the storage devices 1300A and 1300B have a form such as a solid state device (SSD) or a memory card, and may be connected to other components of the system 1000 through an interface such as the connecting interface 1480 to be described later. In some embodiments, a standard protocol such as a universal flash storage (UFS) may be applied to the storage devices 1300A and 1300B. The storage devices 1300A and 1300B may be implemented as the storage device 100 described in FIGS. 1 to 8. Accordingly, the storage devices 1300A and 1300B may program the program data in the first memory region when the capacity of the memory blocks of which data is requested to be erased is greater than the reference capacity. Therefore, it is possible to prevent a read error from occurring in data stored in the storage device for a long time.

The image capturing device 1410 may capture a still image or a moving image, and may include a camera, a camcorder, and/or a webcam.

The user input device 1420 may receive various types of data input from a user of the system 1000, and may include a touch pad, a keypad, a keyboard, a mouse, and/or a microphone.

The sensor 1430 may detect various types of physical quantities that may be obtained from the outside of the system 1000 and may convert the detected physical quantities into electrical signals. In some embodiments, the sensor 1430 may include a temperature sensor, a pressure sensor, an illuminance sensor, a position sensor, an acceleration sensor, a biosensor, and/or a gyroscope.

The communication device 1440 may transmit and receive signals to and from other devices outside the system 1000 according to various communication protocols. The communication device 1440 may be implemented including an antenna, a transceiver, and/or a modem.

The display 1450 and the speaker 1460 may function as output devices outputting visual information and auditory information to users of the system 1000, respectively.

The power supplying device 1470 may appropriately convert power supplied from a battery built in the system 1000 and/or an external power source and may supply the converted power to components of the system 1000.

The connecting interface 1480 may provide a connection between the system 1000 and an external device connected to the system 1000 to transmit and receive data to and from the system 1000. The connecting interface 1480 may be implemented in one of various interface types such as advanced technology attachment (ATA), serial ATA (SATA), external SATA (e-SATA), small computer small interface (SCSI), serial attached SCSI (SAS), peripheral component interconnection (PCI), PCI express (PCIe), NVM express (NVMe), IEEE 1394, a universal serial bus (USB), a secure digital (SD) card, a multi-media card (MMC), embedded multi-media card (eMMC), a universal flash storage (UFS), an embedded universal flash storage (eUFS), and/or a compact flash (CF) card interface.

Figure 10:
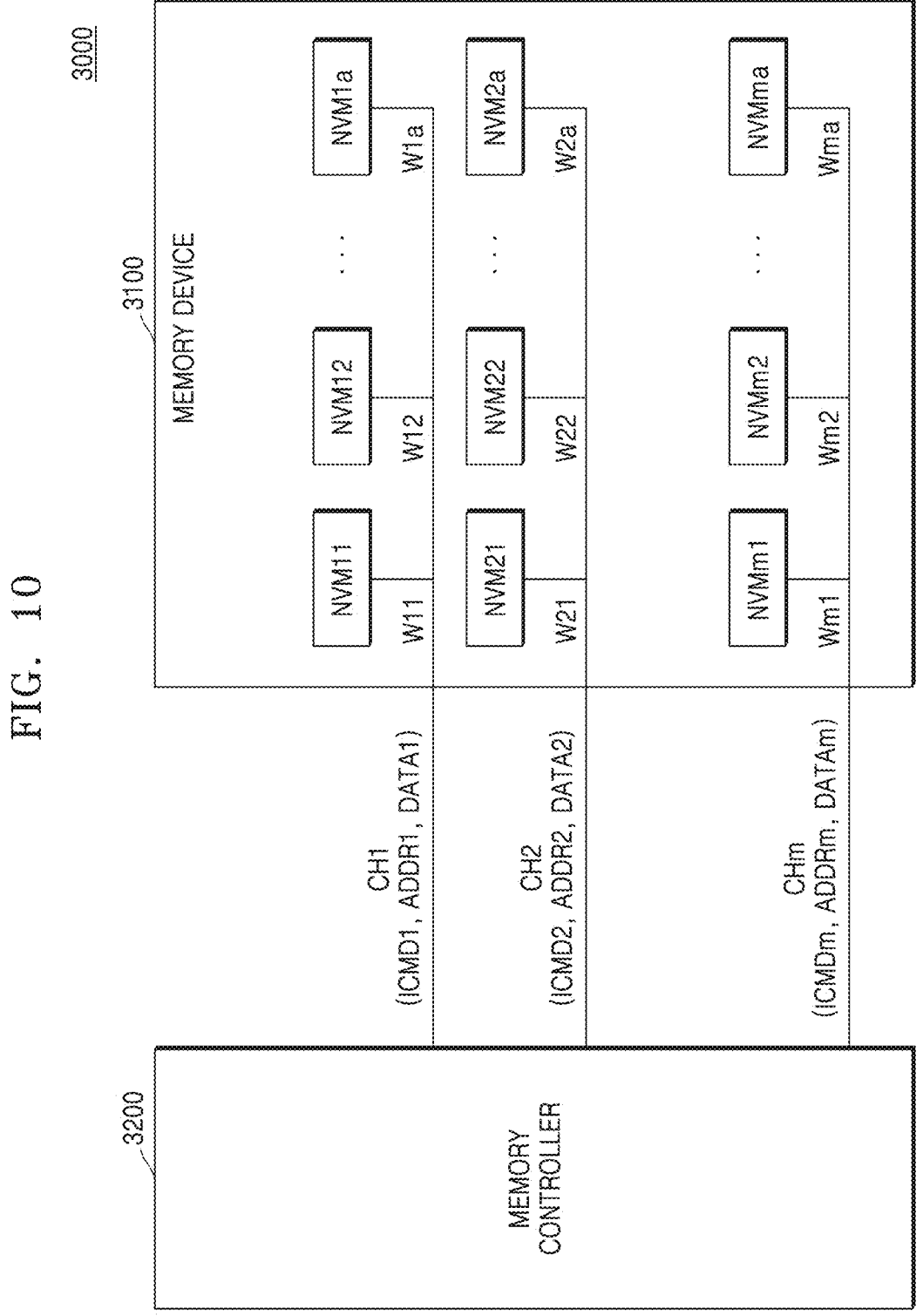
FIG. 10 is a block diagram illustrating a memory system, according to an embodiment.

FIG. 10 is a block diagram illustrating a memory system 3000 according to an embodiment.

Referring to FIG. 10, the memory system 3000 may include a memory device 3100 and a memory controller

3200. The memory system 3000 may support first to mth channels CH1 to CHm, and the memory device 3100 and the memory controller 3200 may be connected to each other through the first to mth channels CH1 to CHm. For example, the memory system 3000 may be implemented as a storage device such as the SSD. The memory device 3100 may include the non-volatile memory 120 of FIG. 1, and the memory controller 3200 may include the storage controller 110 of FIG. 1.

The memory device 3100 may include a plurality of non-volatile memory devices NVM11 to NVMma. Each of the plurality of non-volatile memory devices NVM11 to NVMma may be connected to one of the first to mth channels CH1 to CHm through a corresponding way. For example, the non-volatile memory devices NVM11 to NVM1a may be connected to the first channel CH1 through ways W11 to W1a, and the non-volatile memory devices NVM21 to NVM2a may be connected to the second channel CH2 through ways W21 to W2a. In an embodiment, each of the plurality of non-volatile memory devices NVM11 to NVMma may be implemented as a memory unit that may operate according to individual commands from the memory controller 3200. For example, each of the plurality of non-volatile memory devices NVM11 to NVMma may be implemented as a memory chip or a die. However, embodiments are not limited thereto.

The memory controller 3200 may transmit and receive signals to and from the memory device 3100 through the first to mth channels CH1 to CHm. For example, the memory controller 3200 may transmit first to mth commands ICMD1 to ICMDm, first to mth addresses ADDR1 to ADDRm, and first to mth data items DATA1 to DATAm to the memory device 3100 or may receive the first to mth data items DATA1 to DATAm from the memory device 3100 through the first to mth channels CH1 to CHm.

The memory controller 3200 may select one of the plurality of non-volatile memory devices connected to a corresponding channel through each channel, and may transmit and receive signals to and from the selected non-volatile memory device. For example, the memory controller 3200 may select the non-volatile memory device NVM11 from the non-volatile memory devices NVM11 to NVM1a connected to the first channel CH1. The memory controller 3200 may transmit the first command ICMD1, the first address ADDR1, and the first data DATA1 to the selected non-volatile memory device NVM11 or may receive the first data DATA1 from the selected non-volatile memory device NVM11 through the first channel CH1.

The memory controller 3200 may transmit and receive signals to and from the memory device 3100 in parallel through different channels. For example, the memory controller 3200 may transmit the second command ICMD2 to the memory device 3100 through the second channel CH2 while transmitting the first command ICMD1 to the memory device 3100 through the first channel CH1. For example, while receiving the first data DATA1 from the memory device 3100 through the first channel CH1, the memory controller 3200 may receive the second data DATA2 from the memory device 3100 through the second channel CH2.

The memory controller 3200 may control an overall operation of the memory device 3100. The memory controller 3200 may transmit a signal to each of the first to mth channels CH1 to CHm to control each of the plurality of non-volatile memory devices NVM11 to NVMma connected to the first to mth channels CH1 to CHm. For example, the memory controller 3200 may transmit the first command ICMD1 and the first address ADDR1 to the first channel CH1 to control one selected from the non-volatile memory devices NVM11 to NVM1a.

Each of the plurality of non-volatile memory devices NVM11 to NVMma may operate under the control of the memory controller 3200. For example, the non-volatile memory device NVM11 may program the first data DATA1 according to the first command ICMD1, the first address ADDR1, and the first data DATA1 provided to the first channel CH1. For example, the non-volatile memory device NVM21 may read the second data DATA2 according to the second command ICMD2 and the second address ADDR2 provided to the second channel CH2 and may transmit the read second data DATA2 to the memory controller 3200.

In FIG. 10, it is illustrated that the memory device 3100 communicates with the memory controller 3200 through m channels, and the memory device 3100 includes a non-volatile memory devices corresponding to each channel. However, the number of channels and the number of non-volatile memory devices connected to one channel may be variously changed.

While various embodiments have been particularly shown and described with reference to the drawings, it will be understood that various changes in form and details may be made therein without departing from the spirit and scope of the following claims.

What is claimed is:

1. A storage device comprising:

a storage controller; and a non-volatile memory including a first memory region including first memory cells having a first data retention time and a second memory region including second memory cells having a second data retention time that is shorter than the first data retention time, wherein, based on an erase request being received from a host in a first operation mode, the storage controller is configured to determine whether to switch from the first operation mode to a second operation mode, wherein, the storage controller is configured to program program data in a memory region selected from the first memory region and the second memory region in the first operation mode, and wherein the storage controller is configured to program the program data in only the first memory region in the second operation mode.

2. The storage device of claim 1, wherein the storage controller is configured to switch from the first operation mode to the second operation mode when a capacity of memory blocks of which data is requested to be erased is greater than a reference capacity and to maintain the first operation mode when the capacity is less than or equal to the reference capacity.

3. The storage device of claim 2, wherein the reference capacity is a first reference ratio or more of a total capacity of the non-volatile memory.

4. The storage device of claim 1, wherein, based on a program request being received from the host in the second operation mode, the storage controller is configured to perform a compaction operation to compress the program data and to program the compressed program data in the first memory region.

5. The storage device of claim 1, wherein the storage controller is configured to switch from the first operation mode to the second operation mode when a capacity of memory blocks of which data is requested to be erased is greater than a reference capacity and when a valid page count (VPC) of the non-volatile memory is less than a first reference count, and to maintain the first operation mode when the capacity is less than or equal to the reference capacity or when the VPC is greater than or equal to the first reference count.

6. The storage device of claim 5, wherein the reference capacity is a first reference ratio or more of a total capacity of the non-volatile memory, and wherein the first reference count is less than a second reference ratio of a number of pages included in the non-volatile memory.

7. The storage device of claim 5, wherein, in the second operation mode, the storage controller is configured to switch from the second operation mode to the first operation mode based on the VPC being greater than a second reference count that is different from the first reference count, and to maintain the second operation mode when the VPC is less than or equal the second reference count.

8. The storage device of claim 7, wherein the reference capacity is a first reference ratio or more of a total capacity of the non-volatile memory, wherein the first reference count is less than a second reference ratio of a number of pages included in the non-volatile memory, and wherein the second reference count is a third reference ratio or more of a number of pages included in the first memory region.

9. The storage device of claim 1, wherein the first memory cells comprise memory cells that store data of less than n bits (n is a natural number of 2 or more), the second memory cells comprise memory cells that store data of n bits or more.

10. The storage device of claim 1, wherein the first memory cells include single level cells (SLC) storing 1-bit data, and the second memory cells include multi-level cells (MLC) storing 2-bit data, triple level cells (TLC) storing 3-bit data, and quad level cells (QLC) storing 4-bit data.

11. A storage device comprising:

a storage controller; and a non-volatile memory including a first memory region including first memory cells having a first data retention time and a second memory region including second memory cells having a second data retention time that is less than the first data retention time, wherein, based on an erase request being received from a host in a first operation mode, the storage controller is further configured to switch from the first operation mode to a second operation mode when a capacity of memory blocks of which data is requested to be erased is greater than a reference capacity and a valid page count (VPC) of the non-volatile memory is less than a first reference count, and to maintain the first operation mode when the capacity is less than or equal to the reference capacity or the VPC is greater than or equal to the first reference count, wherein, when a program request is received from the host in the first operation mode, the storage controller is configured to program program data in a memory region selected from the first memory region and the second memory region, and wherein, when the program request is received from the host in the second operation mode, the storage controller is configured to program the program data only in the first memory region.

12. The storage device of claim 11, wherein, when the program request is received from the host in the second operation mode, the storage controller is configured to perform a compaction operation on the program data to compress the program data and to program the compressed program data in the first memory region.

13. The storage device of claim 11, wherein, in the second operation mode, the storage controller is configured to switch from the second operation mode to the first operation mode based on whether the VPC is greater than a second reference count that is different from the first reference count, and to maintain the second operation mode when the VPC is less than or equal to the second reference count.

14. The storage device of claim 11, wherein the first memory cells comprise memory cells that store data of less than n bits (n is a natural number of 2 or more), the second memory cells comprise memory cells that store data of n bits or more.

15. An operating method of a storage device including a non-volatile memory including a first memory region including first memory cells and a second memory region including second memory cells and a storage controller configured to program data or erase data in the non-volatile memory based on a request received from a host, the operating method comprising:

receiving an erase request from the host in a first operation mode in which the program data is programmed in a memory region selected from the first memory region and the second memory region;

determining whether a capacity of memory blocks of which data is requested to be erased is greater than a reference capacity;

based on the capacity being less than or equal to the reference capacity, maintaining the first operation mode;

based on the capacity being greater than the reference capacity, determining whether a valid page count (VPC) of the non-volatile memory is less than a first reference count;

based on the VPC being greater than or equal to the first reference count, maintaining the first operation mode; and based on the VPC being less than the first reference count, switching from the first operation mode to a second operation mode in which the program data is programmed only in the first memory region.

16. The operating method of claim 15, wherein the reference capacity is a first reference ratio or more of a total capacity of the non-volatile memory, and wherein the first reference count is less than a second reference ratio of a number of pages included in the non-volatile memory.

17. The operating method of claim 15, further comprising, in the second operation mode, performing a compaction operation on the program data to compress the program data and programing the compressed program data in the first memory region.

18. The operating method of claim 15, further comprising, in the second operation mode, determining whether the VPC is greater than a second reference count, and switching from the second operation mode to the first operation mode when the VPC is greater than the second reference count; and maintaining the second operation mode when the VPC is less than or equal to the second reference count.

19. The operating method of claim 18, wherein the reference capacity is a first reference ratio or more of a total capacity of the non-volatile memory, wherein the first reference count is less than a second reference ratio of a number of pages included in the non-volatile memory, and wherein the second reference count is a third reference ratio or more of a number of pages included in the first memory region.

20. The operating method of claim 15, wherein the first memory cells comprise memory cells that store data of less than n bits (n is a natural number of 2 or more), the second memory cells comprise memory cells that store data of n bits or more.

* * * * *